US012264593B1

(12) United States Patent
Boyer et al.

(10) Patent No.: US 12,264,593 B1
(45) Date of Patent: Apr. 1, 2025

(54) DAMPED BLADED ROTOR FOR GAS TURBINE ENGINE

(71) Applicant: Pratt & Whitney Canada Corp., Longueuil (CA)

(72) Inventors: Philippe Boyer, Saint Isidore (CA); Prakul Mittal, Longueuil (CA); Yashiva Dorsamy, St Hubert (CA); Jasrobin Grewal, Pincourt (CA); Domenico Di Florio, Saint Lazare (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/388,305

(22) Filed: Nov. 9, 2023

(51) Int. Cl.
*F01D 25/06* (2006.01)
*F01D 5/30* (2006.01)

(52) U.S. Cl.
CPC ............... *F01D 25/06* (2013.01); *F01D 5/30* (2013.01); *F05D 2220/323* (2013.01); *F05D 2240/30* (2013.01); *F05D 2260/96* (2013.01)

(58) Field of Classification Search
CPC . F01D 25/04; F01D 25/06; F01D 5/10; F01D 5/26; F01D 5/30; F05D 2260/96; F05D 2220/323; F05D 2240/30
See application file for complete search history.

(56) References Cited

U.S. PATENT DOCUMENTS 5,373,922 A 12/1994 Marra
6,438,838 B1 * 8/2002 Meier .................. F01D 5/3061 228/119
9,151,170 B2 10/2015 El-Aini
10,408,233 B2 9/2019 Klauke
10,450,865 B2 10/2019 Pankratov
2017/0306772 A1 10/2017 Fulayter
2018/0087384 A1 * 3/2018 Pankratov ................. F01D 5/10
2018/0313216 A1 * 11/2018 Montes Parra ........... F01D 5/10
2020/0072056 A1 3/2020 Pankratov

FOREIGN PATENT DOCUMENTS

DE 2064653 A1 7/1972
GB 2255138 B 4/1994
JP 05030813 B2 9/2009

OTHER PUBLICATIONS

EP Search Report for EP Patent Application No. 24211850.3 dated Feb. 5, 2025.

* cited by examiner

*Primary Examiner* — Elton K Wong
(74) *Attorney, Agent, or Firm* — Getz Balich LLC

(57) ABSTRACT

An assembly is provided for a gas turbine engine. This assembly includes an integrally bladed rotor and a damper. The integrally bladed rotor is rotatable about an axis. The integrally bladed rotor includes a plurality of rotor blades and a rotor disk. The rotor blades are arranged circumferentially around and project radially out from the rotor disk. The rotor disk includes a flange, a groove and a plurality of slots. The groove extends circumferentially around the axis within the flange. The groove projects radially into the flange from an inner side of the flange. The slots are arranged circumferentially about the axis along the groove. Each of the slots projects radially into the flange from the inner side of the flange. The damper is mounted to the rotor disk and seated within the groove.

17 Claims, 8 Drawing Sheets

DAMPED BLADED ROTOR FOR GAS TURBINE ENGINE

TECHNICAL FIELD

This disclosure relates generally to a gas turbine engine and, more particularly, to a bladed rotor for the gas turbine engine.

BACKGROUND INFORMATION

A gas turbine engine includes multiple bladed rotors. Various types and configurations of bladed rotors are known in the art, including integrally bladed rotors (IBRs). While these known bladed rotors have various benefits, there is still room in the art for improvement.

SUMMARY

According to an aspect of the present disclosure, an assembly is provided for a gas turbine engine. This assembly includes an integrally bladed rotor and a damper. The integrally bladed rotor is rotatable about an axis. The integrally bladed rotor includes a plurality of rotor blades and a rotor disk. The rotor blades are arranged circumferentially around and project radially out from the rotor disk. The rotor disk includes a flange, a groove and a plurality of slots. The groove extends circumferentially around the axis within the flange. The groove projects radially into the flange from an inner side of the flange. The slots are arranged circumferentially about the axis along the groove. Each of the slots projects radially into the flange from the inner side of the flange. The damper is mounted to the rotor disk and seated within the groove.

According to another aspect of the present disclosure, another assembly is provided for a gas turbine engine. This assembly includes a rotor and a damper ring. The rotor is rotatable about an axis. The rotor includes a rotor disk and a plurality of rotor blades. The rotor disk includes an annular flange, an annular groove and a plurality of slots axially intersecting the annular groove. The annular groove is formed in the annular flange at an inner side of the annular flange. The slots are formed in the annular flange at the inner side of the annular flange. The slots are arranged circumferentially about the axis along the annular groove. The rotor blades are connected to the rotor disk and project radially out from an outer periphery of the rotor disk. The rotor blades are arranged circumferentially about the axis in an array such that each of the slots is circumferentially associated with a respective one of the rotor blades. The damper ring is attached to the rotor disk and arranged within the groove.

According to still another aspect of the present disclosure, another assembly is provided for a gas turbine engine. This assembly includes a turbine rotor and a plurality of damper rings. The turbine rotor is rotatable about an axis. The turbine rotor includes a turbine disk and a plurality of turbine blades. The turbine disk includes a web. The turbine blades are formed integral with the turbine disk and project radially out from an outer periphery of the turbine disk. The damper rings are mounted to the turbine disk. A first of the damper rings is seated in a first scalloped groove of the turbine disk axially between the web and an upstream side of the turbine rotor. A second of the damper rings is seated in a second scalloped groove of the turbine disk axially between the web and a downstream side of the turbine rotor.

The integrally bladed rotor may be configured as a turbine rotor for the gas turbine engine.

The assembly may also include a compressor section, a combustor section, a turbine section and a flowpath extending longitudinally through the compressor section, the combustor section and the turbine section from an inlet into the flowpath to an exhaust from the flowpath. The turbine section may include the integrally bladed rotor.

The groove may extend axially within the flange between opposing axial groove side surfaces.

The rotor blades may only include a first quantity of rotor blades. The slots may only include a second quantity of slots. The second quantity of slots may be equal to the first quantity of rotor blades divided by an integer N.

The integer N may be equal to one.

Each of the slots may be circumferentially aligned with a respective one of the rotor blades.

Each of the slots may be circumferentially offset from a leading edge or a trailing edge of the respective one of the rotor blades.

Each of the slots may axially intersect the groove.

Each of the slots may extend axially across the groove.

The groove may project radially into the flange from the inner side of the flange to an outer end of the groove. Each of the slots may project radially into the flange from the outer end of the groove.

The slots may include a first slot. The first slot may project axially into the flange from an end of the flange.

The slots may include a first slot. The first slot may extend axially within the flange between opposing axial slot end surfaces.

The slots may include a first slot. The first slot may include a first slot section and a second slot section circumferentially aligned with the first slot section. The first slot section may extend axially into the flange from a first side of the groove. The second slot section may extend axially into the flange from a second side of the groove.

The slots may include a first slot. The first slot may have a curved peripheral geometry in a plane perpendicular to the axis.

Each laterally neighboring pair of the slots may be laterally separated by a respective portion of the flange at the inner side of the flange.

The rotor disk may also include a web. The damper may be arranged axially between the web and an upstream side of the integrally bladed rotor.

The rotor disk may also include a web. The damper may be arranged axially between the web and a downstream side of the integrally bladed rotor.

The assembly may also include a second damper mounted to the rotor disk. The second damper may be arranged axially between the web and an upstream side of the integrally bladed rotor.

The rotor disk may also include a platform. The rotor blades may project radially out from the platform. The platform may include the flange.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
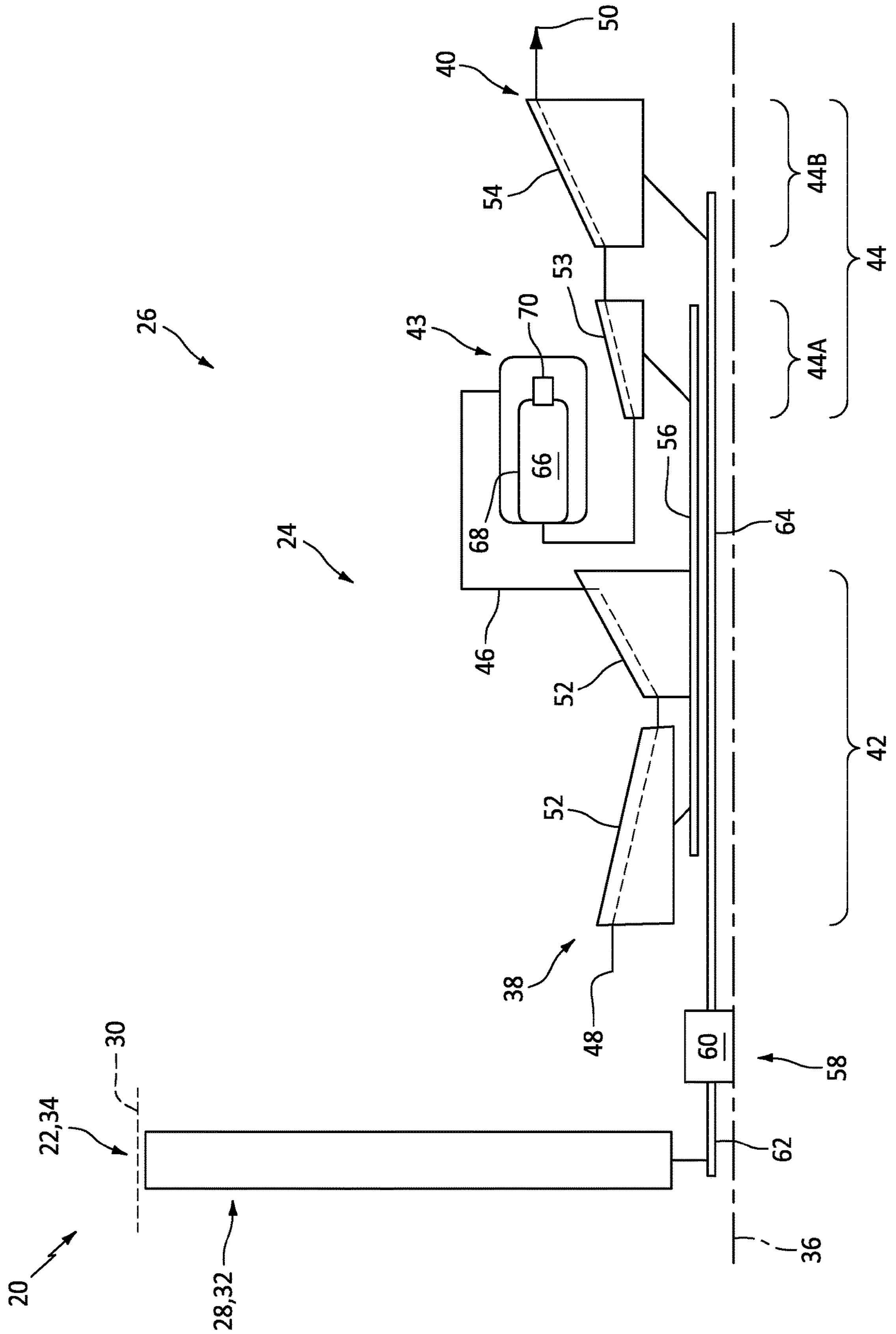
FIG. 1 is a partial side schematic illustration of a powerplant for an aircraft.

FIG. 1 illustrates a powerplant 20 for an aircraft. The aircraft may be an airplane, a helicopter, a drone (e.g., an unmanned aerial vehicle (UAV)) or any other manned or unmanned aerial vehicle or system. The powerplant 20 may be configured as, or otherwise included as part of, a propulsion system for the aircraft. The powerplant 20 may also or alternatively be configured as, or otherwise included as part of, an electrical power system for the aircraft. The powerplant 20 of the present application, however, is not limited to aircraft applications. The powerplant 20, for example, may alternatively be configured as, or otherwise included as part of, an industrial gas turbine engine for a land-based electrical powerplant. The powerplant 20 of FIG. 1 includes a mechanical load 22 and a core 24 of a gas turbine engine 26.

The mechanical load 22 may be configured as or otherwise include a rotor 28 mechanically driven and/or otherwise powered by the engine core 24. This driven rotor 28 may be a bladed propulsor rotor (e.g., an air mover) where the powerplant 20 is (or is part of) the aircraft propulsion system. The propulsor rotor may be an open (e.g., unducted) propulsor rotor or a ducted propulsor rotor housed within a duct 30; e.g., a fan duct. Examples of the open propulsor rotor include a propeller rotor for a turboprop gas turbine engine, a rotorcraft rotor (e.g., a main helicopter rotor) for a turboshaft gas turbine engine, a propfan rotor for a propfan gas turbine engine, and a pusher fan rotor for a pusher fan gas turbine engine. An example of the ducted propulsor rotor is a fan rotor 32 for a turbofan gas turbine engine. The present disclosure, however, is not limited to the foregoing exemplary propulsor rotor arrangements. Moreover, the driven rotor 28 may alternatively be a generator rotor of an electric power generator where the powerplant 20 is (or is part of) the aircraft power system; e.g., an auxiliary power unit (APU) for the aircraft. However, for ease of description, the mechanical load 22 is described below as a fan section 34 of the gas turbine engine 26, and the driven rotor 28 is described below as the fan rotor 32 within the fan section 34.

The gas turbine engine 26 extends axially along an axis 36 between and to an upstream end of the gas turbine engine 26 and a downstream end of the gas turbine engine 26. This axis 36 may be a centerline axis of any one or more of the powerplant members 24, 26 and 28. The axis 36 may also or alternatively be a rotational axis of one or more rotating assemblies (e.g., 38 and 40) of the gas turbine engine 26 and its engine core 24.

The engine core 24 includes a compressor section 42, a combustor section 43, a turbine section 44 and a core flowpath 46. The turbine section 44 includes a high pressure turbine (HPT) section 44A and a low pressure turbine (LPT) section 44B; e.g., a power turbine (PT) section. The core flowpath 46 extends sequentially, longitudinally through the compressor section 42, the combustor section 43, the HPT section 44A and the LPT section 44B from an airflow inlet 48 into the core flowpath 46 to a combustion products exhaust 50 from the core flowpath 46. The core inlet 48 of FIG. 1 is disposed towards the engine upstream end, downstream of the fan section 34 and its fan rotor 32. The core exhaust 50 of FIG. 1 is disposed at (e.g., on, adjacent or proximate) or otherwise towards the engine downstream end.

Each of the engine sections 42, 44A and 44B includes one or more respective bladed rotors 52-54. The compressor rotors 52 are coupled to and rotatable with the HPT rotor 53. The compressor rotors 52 of FIG. 1, for example, are connected to the HPT rotor 53 by a high speed shaft 56. At least (or only) the compressor rotors 52, the HPT rotor 53 and the high speed shaft 56 collectively form the high speed rotating assembly 38; e.g., a high speed spool. The fan rotor 32 is coupled to and rotatable with the LPT rotor 54. The fan rotor 32 of FIG. 1, for example, is connected to the LPT rotor 54 by a drivetrain 58. This drivetrain 58 may be configured as a geared drivetrain. The fan rotor 32 of FIG. 1, for example, is connected to a geartrain 60 by a fan shaft 62, where the geartrain 60 may be an epicyclic geartrain or another type of gear system and/or transmission. The geartrain 60 is connected to the LPT rotor 54 through a low speed shaft 64. With this arrangement, the LPT rotor 54 may rotate at a different (e.g., faster) speed than the fan rotor 32 (the driven rotor 28). At least (or only) the fan rotor 32, the LPT rotor 54, the engine shafts 62 and 64 and the geartrain 60 collectively form the low speed rotating assembly 40. In other embodiments, however, the drivetrain 58 may alternatively be configured as a direct drive system where the geartrain 60 is omitted and the LPT rotor 54 and the fan rotor 32 (the driven rotor 28) rotate at a common (the same) speed. Referring again to FIG. 1, each of the rotating assemblies 38 and 40 and its members may be rotatable about the axis 36.

During operation of the powerplant 20 and its gas turbine engine 26, air may be directed across the fan rotor 32 and into the engine core 24 through the core inlet 48. This air entering the core flowpath 46 may be referred to as "core air". The core air is compressed by the compressor rotors 52 and directed into a combustion chamber 66 (e.g., an annular combustion chamber) within a combustor 68 (e.g., an annular combustor) of the combustor section 43. Fuel is injected into the combustion chamber 66 by one or more fuel injectors 70 and mixed with the compressed core air to provide a fuel-air mixture. This fuel-air mixture is ignited and combustion products thereof flow through and sequentially cause the HPT rotor 53 and the LPT rotor 54 to rotate. The rotation of the HPT rotor 53 drives rotation of the compressor rotors 52 and, thus, the compression of the air received from the core inlet 48. The rotation of the LPT rotor 54 drives rotation of the fan rotor 32 (the driven rotor 28). Where the driven rotor 28 is configured as the propulsor rotor, the rotation of that propulsor rotor may propel additional air (e.g., outside air, bypass air, etc.) outside of the engine core 24 to provide aircraft thrust and/or lift. The rotation of the fan rotor 32, for example, propels bypass air through a bypass flowpath outside of the engine core 24 to provide aircraft thrust. However, where the driven rotor 28 is configured as the generator rotor, the rotation of that generator rotor may facilitate generation of electricity.

For ease of description, the gas turbine engine 26 is described above with an exemplary arrangement of engine sections 34, 42, 43, 44A and 44B and an exemplary arrangement of rotating assemblies 38 and 40. The present disclosure, however, is not limited to such exemplary arrangements. The compressor section 42, for example, may include a low pressure compressor (LPC) section and a high pressure compressor (HPC) section, where one or more of the compressor rotors 52 may be disposed in the HPC section and the LPC section may include a low pressure compressor (LPC) rotor coupled to the LPT rotor 54 through the low speed shaft 64. In another example, the gas turbine engine 26 and its engine core 24 may include a single rotating assembly (e.g., spool), or more than two rotating assemblies (e.g., spools).

Figure 2:
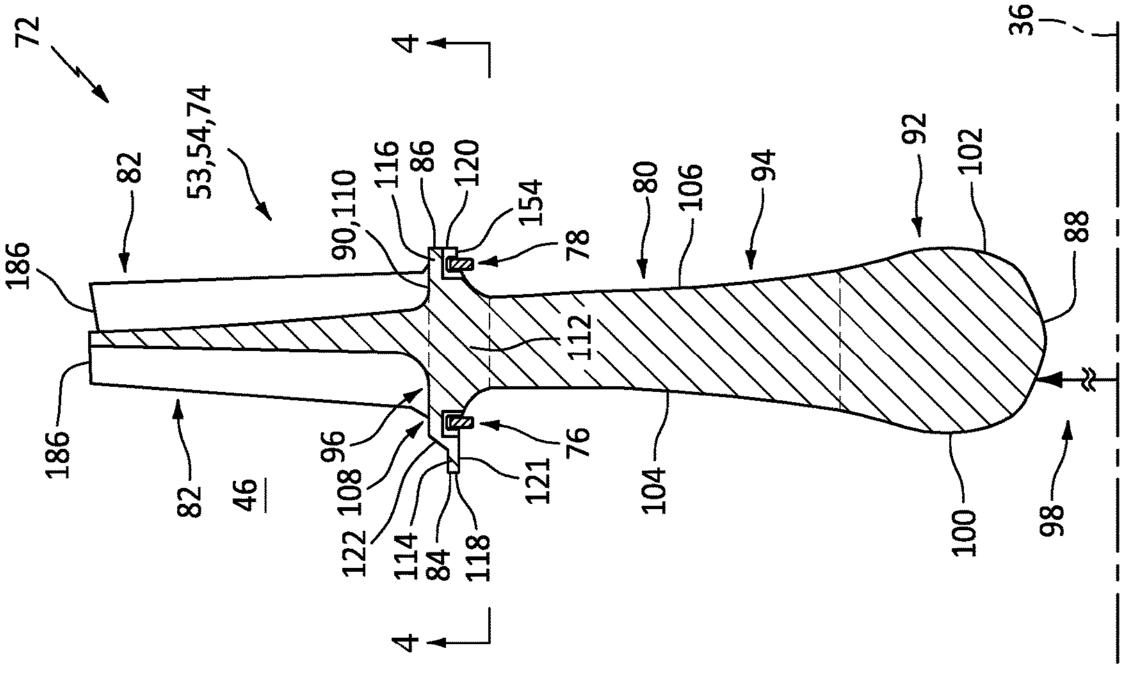
FIG. 2 is a partial side sectional illustration of a rotor assembly.

FIG. 2 illustrates a rotor assembly 72 for the gas turbine engine 26 and its engine core 24. This rotor assembly 72 includes an integrally bladed rotor (IBR) 74 and one or more annular dampers 76 and 78; e.g., damper rings.

Figure 3:
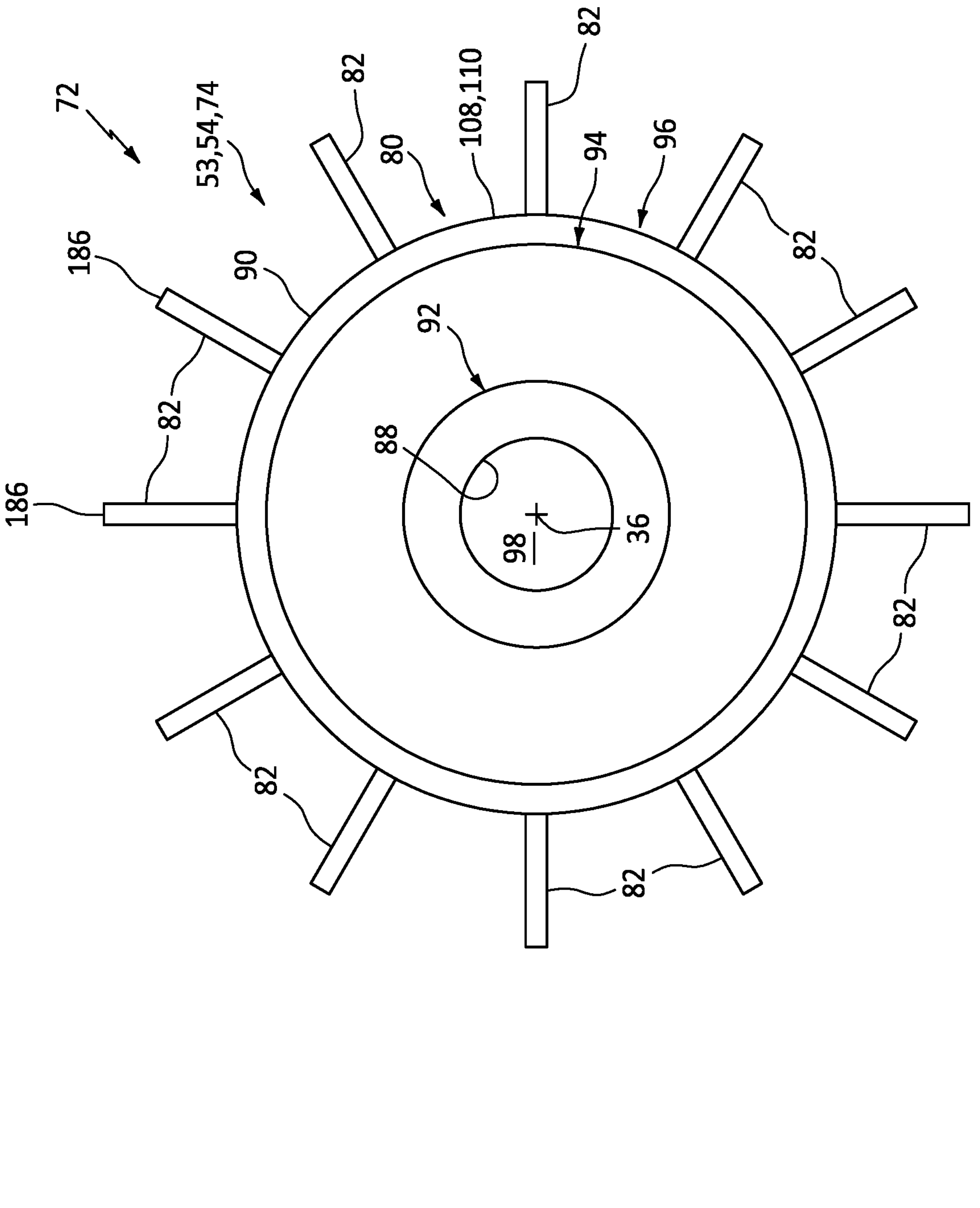
FIG. 3 is a schematic illustration of the rotor assembly.

The bladed rotor 74 may be configured as the HPT rotor 53 or the LPT rotor 54. However, it is contemplated these teachings may also be applied to one or more of the compressor rotors 52; see FIG. 1. Referring to FIG. 3, the bladed rotor 74 is rotatable about the axis 36. This bladed rotor 74 includes a rotor disk 80 (e.g., a turbine disk) and a plurality of rotor blades 82 (e.g., turbine blades).

Referring to FIG. 2, the rotor disk 80 extends axially along the axis 36 between and to an axial upstream side 84 of the bladed rotor 74 and its rotor disk 80 and an axial downstream side 86 of the bladed rotor 74 and its rotor disk 80. Here, the rotor upstream side 84 is upstream of the rotor downstream side 86 along the core flowpath 46. The rotor disk 80 extends radially from a radial inner side 88 of the bladed rotor 74 and its rotor disk 80 to a radial outer side 90 of the rotor disk 80. The rotor disk 80 extends circumferentially about the axis 36 providing the rotor disk 80 with a full-hoop (e.g., annular) geometry; see also FIG. 3. The rotor disk 80 of FIG. 2 includes an annular disk hub 92, an annular disk web 94 and an annular disk rim 96.

The disk hub 92 may form an inner mass of the rotor disk 80. The disk hub 92 is disposed at the rotor inner side 88 and forms a radial inner periphery of the bladed rotor 74 and its rotor disk 80. The disk hub 92 of FIG. 2 thereby forms and circumscribes an inner bore 98 of the bladed rotor 74, which inner bore 98 extends axially along the axis 36 through the bladed rotor 74 and its rotor disk 80. The disk hub 92 extends axially along the axis 36 between and to opposing axial sides 100 and 102 of the disk hub 92.

The disk web 94 is radially between and connects the disk hub 92 and the disk rim 96. The disk web 94 of FIG. 2, for example, projects radially out from (in an outward direction away from the axis 36) the disk hub 92 to the disk rim 96. This disk web 94 is formed integral with the disk hub 92 and the disk rim 96. The disk web 94 extends axially along the axis 36 between and to opposing axial sides 104 and 106 of the disk web 94. The web upstream side 104 may be axially recessed from the hub upstream side 100. The web downstream side 106 may be axially recessed from the hub downstream side 102. An axial width of the disk web 94 may thereby be different (e.g., thinner) than an axial width of the disk hub 92. The present disclosure, however, is not limited to such an exemplary arrangement.

The disk rim 96 is disposed at the disk outer side 90 and forms a radial outer periphery of the rotor disk 80. This disk rim 96 of FIG. 2 also forms a radial inner platform 108 of the bladed rotor 74. A radial outer surface 110 of the inner platform 108 forms an inner peripheral boundary of the core flowpath 46 longitudinally (e.g., axially in FIG. 2) across the bladed rotor 74.

The disk rim 96 of FIG. 2 includes a rim base 112, an axial upstream flange 114 and an axial downstream flange 116. The rim base 112 is axially aligned with and radially outboard of the disk web 94. This rim base 112 connects the upstream flange 114 and the downstream flange 116 to the disk web 94. The upstream flange 114 projects axially along the axis 36 (in an upstream direction along the core flowpath 46) out from the rim base 112 and the disk web 94 to an axial distal end 118 of the upstream flange 114 at the rotor upstream side 84. The downstream flange 116 projects axially along the axis 36 (in a downstream direction along the core flowpath 46) out from the rim base 112 and the disk web 94 to an axial distal end 120 of the downstream flange 116 at the rotor downstream side 86. With this arrangement, the rim members 112, 114 and 116 collectively form the inner platform 108 and its platform outer surface 110. More particularly, the upstream flange 114 forms an axial upstream section of the platform outer surface 110. The downstream flange 116 forms an axial downstream section of the platform outer surface 110. The rim base 112 forms an axial intermediate section of the platform outer surface 110 extending axially between the upstream section of the platform outer surface 110 and the downstream section of the platform outer surface 110.

Figure 4:
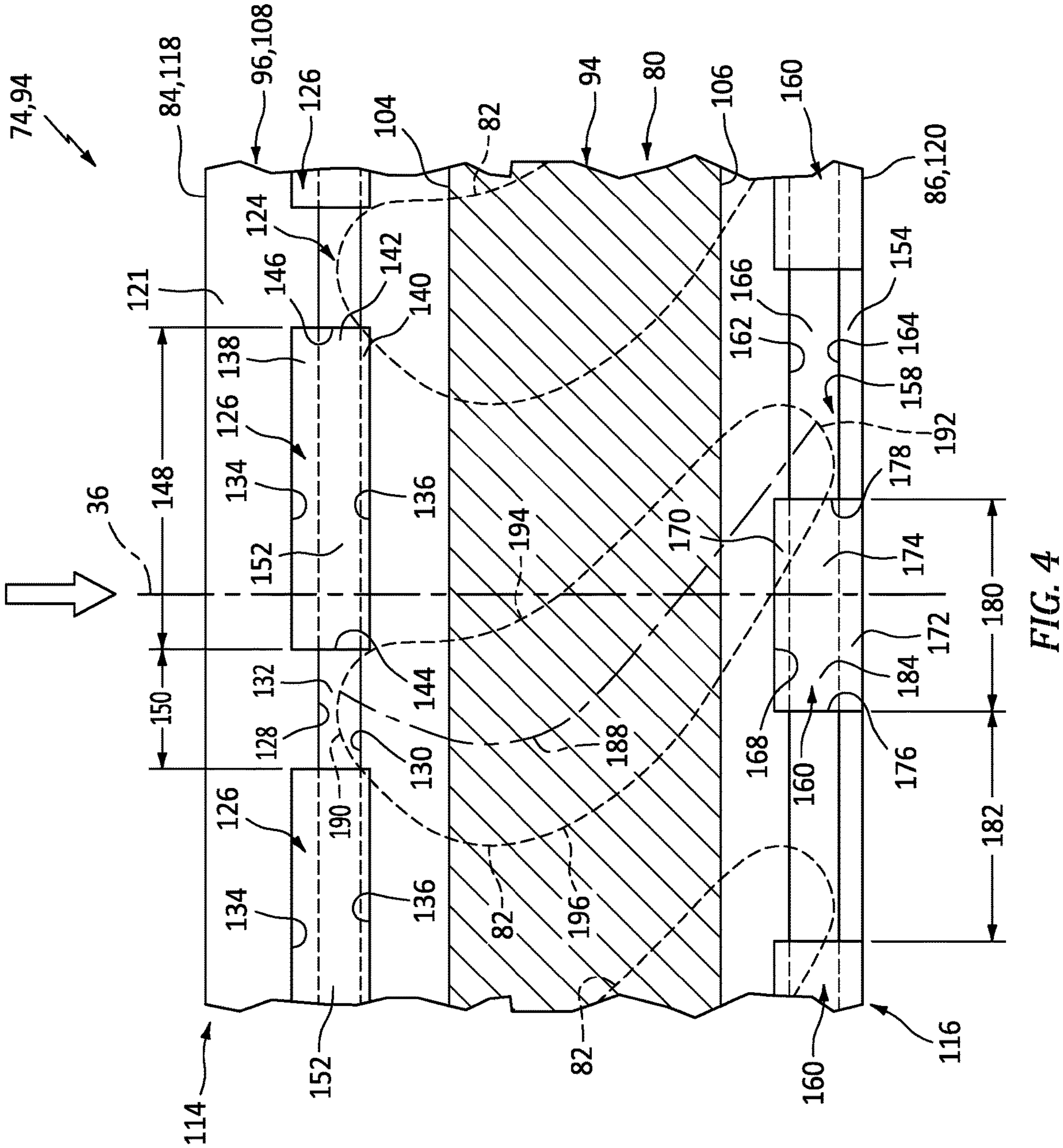
FIG. 4 is a partial sectional illustration of an integrally bladed rotor taken along line 4-4 in FIG. 2, where rotor blades and an axis are projected onto the illustration.
Figure 5:
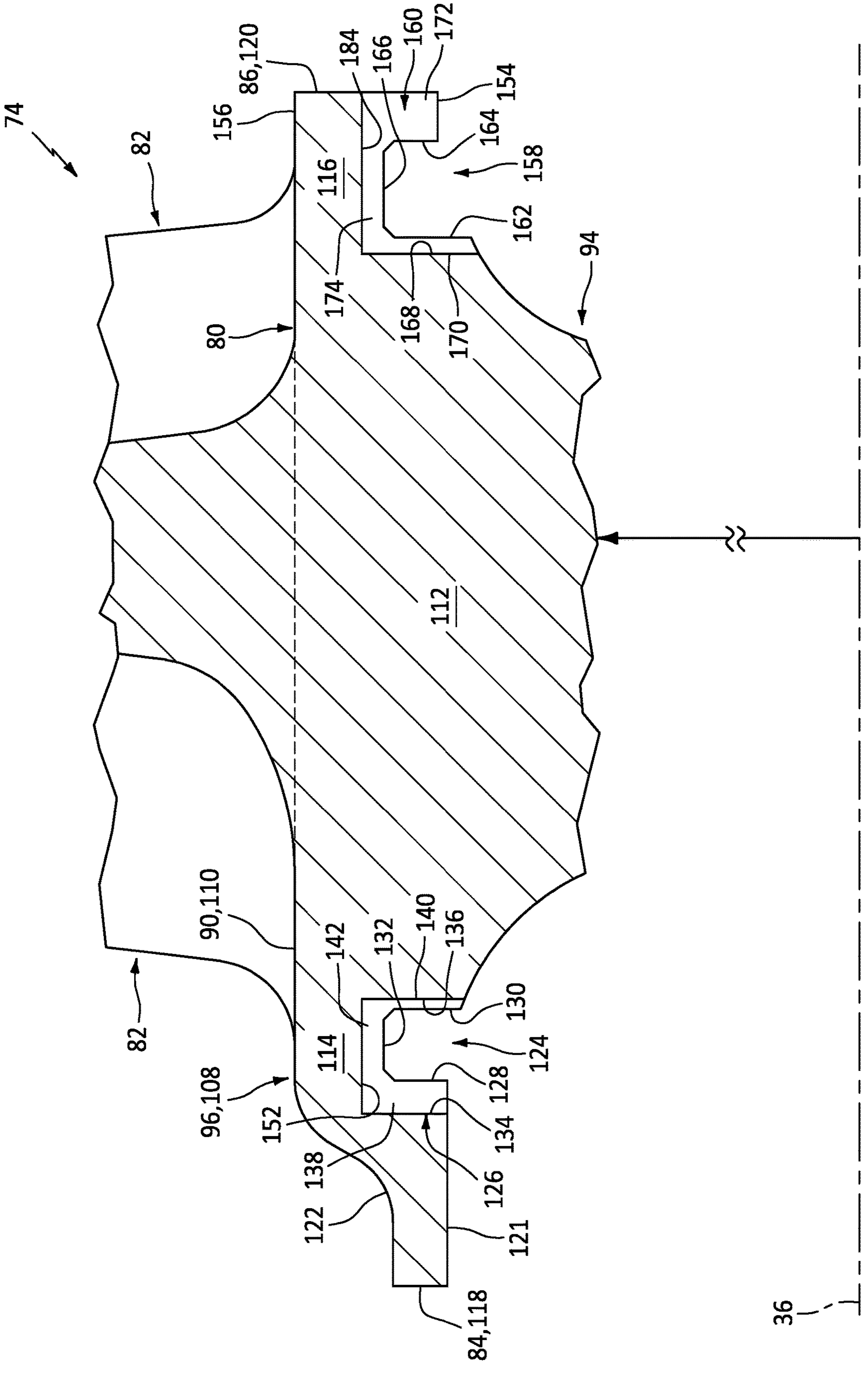
FIG. 5 is a partial sectional illustration of the bladed rotor.

The upstream flange 114 extends radially from a radial inner side 121 of the upstream flange 114 to the platform outer surface 110 at a radial outer side 122 of the upstream flange 114; see also FIG. 5. The upstream flange 114 extends circumferentially around the axis 36 providing the upstream flange 114 with a full-hoop (e.g., annular) geometry. Referring to FIG. 4, the disk rim 96 and its upstream flange 114 include an annular upstream groove 124 and a plurality of upstream slots 126 (e.g., scallops, pockets, etc.), where each of these upstream apertures 124 and 128 is formed by the upstream flange 114 at its upstream flange inner side 121.

The upstream groove 124 extends circumferentially around the axis 36 within the upstream flange 114. The upstream groove 124 extends axially along the axis 36 within the upstream flange 114 between opposing axial groove side surfaces 128 and 130 of the upstream flange 114. The upstream groove side surface 128 forms an axial upstream side of the upstream groove 124 within the upstream flange 114. The downstream groove side surface 130 forms an axial downstream side of the upstream groove 124 within the upstream flange 114. Referring to FIG. 5, the upstream groove 124 projects radially into the upstream flange 114 (in the outward direction away from the axis 36) from the upstream flange inner side 121 to a (e.g., circumferentially segmented) radial outer groove end surface 132. This groove end surface 132 of FIG. 5 extends axially along the axis 36 between and to the groove side surfaces 128 and 130. The groove end surface 132 forms a radial distal outer end of the upstream groove 124 within the upstream flange 114.

Referring to FIG. 4, the upstream slots 126 are arranged (e.g., equispaced) circumferentially about the axis 36 and along the upstream groove 124 in an annular array; e.g., a circular array. Each of these upstream slots 126 axially intersects the upstream groove 124. Each upstream slot 126 of FIG. 4, for example, extends axially across the upstream groove 124 and between a respective set of opposing axial slot end surfaces 134 and 136 of the upstream flange 114. The upstream slot end surface 134 forms an axial upstream end of a respective one of the upstream slots 126 within the upstream flange 114. The downstream slot end surface 136 forms an axial downstream end of a respective one of the upstream slots 126 within the upstream flange 114. More particularly, each upstream slot 126 of FIG. 4 includes an axial upstream slot section 138 (e.g., a notch), an axial downstream slot section 140 (e.g., a notch) and an axial intermediate slot section 142 (e.g., a channel). The upstream slot section 138 projects axially along the axis 36 into the upstream flange 114 from the upstream groove side surface 128 to its respective upstream slot end surface 134. The downstream slot section 140 projects axially along the axis 36 into the upstream flange 114 from the downstream groove side surface 130 to its respective downstream slot end surface 136. The intermediate slot section 142 extends axially along the axis 36 within the upstream flange 114 and across the upstream groove 124 from the upstream slot section 138 to the downstream slot section 140. In other embodiments, however, it is contemplated the intermediate slot section 142 may be omitted.

Each upstream slots 126 and its respective sections 138, 140 and 142 extends laterally (e.g., circumferentially) within the upstream flange 114 between lateral opposing sides 144 and 146 of the respective upstream slot 126. Each upstream slot 126 of FIG. 4 has a lateral width 148 extending between its respective lateral opposing sides 144 and 146, which upstream slot width 148 may be measured at the upstream flange inner side 121. Each laterally neighboring (e.g., adjacent) pair of the upstream slots 126 is laterally separated by a respective (e.g., continuous) portion of the upstream flange 114 at the upstream flange inner side 121. Each laterally neighboring pair of the upstream slots 126 is thereby laterally separated by a lateral distance 150. This inter-upstream slot distance 150 may be different (e.g., less) than the upstream slot width 148.

Referring to FIG. 5, each upstream slots 126 and its respective sections 138 and 140 projects radially into the upstream flange 114 (in the outward direction away from the axis 36) from the upstream flange inner side 121 to a radial outer distal side 152 of the respective upstream slot 126. Here, the intermediate slot section 142 may also project radially into the upstream flange 114 from the groove end surface 132 to the outer distal side 152 of the respective upstream slot 126. Thus, each upstream slot 126 and its intermediate slot section 142 may project further radially into the upstream flange 114 from the upstream groove 124. With the above-described arrangement, the upstream slots 126 are configured to change a structural stiffness of the upstream flange 114 along the upstream groove 124.

The downstream flange 116 extends radially from a radial inner side 154 of the downstream flange 116 to the platform outer surface 110 at a radial outer side 156 of the downstream flange 116. The downstream flange 116 extends circumferentially around the axis 36 providing the downstream flange 116 with a full-hoop (e.g., annular) geometry. Referring to FIG. 4, the disk rim 96 and its downstream flange 116 include an annular downstream groove 158 and a plurality of downstream slots 160 (e.g., scallops, pockets, etc.), where each of these downstream apertures 158 and 160 is formed by the downstream flange 116 at its downstream flange inner side 154.

The downstream groove 158 extends circumferentially around the axis 36 within the downstream flange 116. The downstream groove 158 extends axially along the axis 36 within the downstream flange 116 between opposing axial groove side surfaces 162 and 164 of the downstream flange 116. The upstream groove side surface 162 forms an axial upstream side of the downstream groove 158 within the downstream flange 116. The downstream groove side surface 164 forms an axial downstream side of the downstream groove 158 within the downstream flange 116. Referring to FIG. 5, the downstream groove 158 projects radially into the downstream flange 116 (in the outward direction away from the axis 36) from the downstream flange inner side 154 to a (e.g., circumferentially segmented) radial outer groove end surface 166. This groove end surface 166 of FIG. 5 extends axially along the axis 36 between and to the groove side surfaces 162 and 164. The groove end surface 166 forms a radial distal outer end of the downstream groove 158 within the downstream flange 116.

Referring to FIG. 4, the downstream slots 160 are arranged (e.g., equispaced) circumferentially about the axis 36 and along the downstream groove 158 in an annular array; e.g., a circular array. Each of these downstream slots 160 axially intersects the downstream groove 158. Each downstream slot 160 of FIG. 4, for example, extends axially across the downstream groove 158 and between the downstream flange distal end 120 and an axial slot end surface 168 of the downstream flange 116. The slot end surface 168 forms an axial upstream end of a respective one of the downstream slots 160 within the downstream flange 116. An axial downstream end of a respective one of the downstream slots 160 is defined at the downstream flange distal end 120. More particularly, each downstream slot 160 projects axially along the axis 36 into the downstream flange 116 from the downstream flange distal end 120 (across the downstream groove 158) to the respective slot end surface 168. Each downstream slot 160 of FIG. 4 includes an axial upstream slot section 170 (e.g., a notch), an axial downstream slot section 172 (e.g., a channel) and an axial intermediate slot section 174 (e.g., a channel). The upstream slot section 170 projects axially along the axis 36 into the downstream flange 116 from the upstream groove side surface 162 to its respective slot end surface 168. The downstream slot section 172 projects axially along the axis 36 into the downstream flange 116 from the downstream groove side surface 164 to the downstream flange distal end 120. The intermediate slot section 174 extends axially along the axis 36 within the downstream flange 116 and across the downstream groove 158 from the upstream slot section 170 to the downstream slot section 172. In other embodiments, however, it is contemplated the intermediate slot section 174 may be omitted.

Each downstream slots 160 and its respective sections 170, 172 and 174 extend laterally (e.g., circumferentially) within the downstream flange 116 between lateral opposing sides 176 and 178 of the respective downstream slot 160. Each downstream slot 160 of FIG. 4 has a lateral width 180 extending between its respective lateral opposing sides 176 and 178, which downstream slot width 180 may be measured at the downstream flange inner side 154. The downstream slot width 180 may be different (e.g., less) than the upstream slot width 148. Each laterally neighboring (e.g., adjacent) pair of the downstream slots 160 is laterally separated by a respective (e.g., continuous) portion of the downstream flange 116 at the downstream flange inner side 154. Each laterally neighboring pair of the downstream slots 160 is thereby laterally separated by a lateral distance 182. This inter-downstream slot distance 182 may be equal to or different than the downstream slot width 180. The inter-downstream slot distance 182 may be different (e.g., greater) than the inter-upstream slot distance 150.

Referring to FIG. 5, each downstream slots 160 and its respective sections 170 and 172 projects radially into the downstream flange 116 (in the outward direction away from the axis 36) from the downstream flange inner side 154 to a radial outer distal side 184 of the respective downstream slot 160. Here, the intermediate slot section 174 may also project radially into the downstream flange 116 from the groove end surface 166 to the outer distal side 184 of the respective downstream slot 160. Thus, each downstream slot 160 and its intermediate slot section 174 may project further radially into the downstream flange 116 from the downstream groove 158. With the above-described arrangement, the downstream slots 160 are configured to change a structural stiffness of the downstream flange 116 along the downstream groove 158.

Referring to FIG. 3, the rotor blades 82 are arranged circumferentially about the axis 36 in an annular array; e.g., a circular array. This array of rotor blades 82 is disposed radially outboard of and circumscribes the rotor disk 80 and its inner platform 108. Each rotor blade 82 is configured as an airfoil which projects radially (e.g., spanwise) out from the rotor disk 80 and its platform outer surface 110 to a tip 186 of the respective rotor blade 82. Each of the rotor blades 82 is formed integral with the rotor disk 80. The bladed rotor 74, more particularly, is formed as a single unitary body. Here, the term "unitary" may describe a body without severable parts. By contrast, a traditional bladed rotor includes rotor blades which are mechanically attached to a rotor disk through, for example, dovetail interfaces, firtree interfaces or other removeable attachments.

Referring to FIG. 4, each rotor blade 82 and its airfoil extends along a camber line 188 between and to an upstream leading edge 190 of the rotor blade 82 and its airfoil and a downstream trailing edge 192 of the rotor blade 82 and its airfoil. Each rotor blade 82 and its airfoil extends laterally between and to a first (e.g., concave, pressure) side 194 of the rotor blade 82 and its airfoil and a second (e.g., convex, suction) side 196 of the rotor blade 82 and its airfoil.

The bladed rotor 74 includes a quantity X of the rotor blades 82, a quantity Y of the upstream slots 126, and a quantity Z of the downstream slots 160. The quantity Y may be equal to the quantity X divided by a first integer N1 (e.g., 1, 2, 3, etc.). Similarly, the quantity Z may be equal to the quantity X divided by a second integer N2 (e.g., 1, 2, 3, etc.), where second integer N2 may be equal to or different than first integer N1. For example, the bladed rotor 74 of FIG. 4 has a one-to-one (1:1) ratio between the rotor blades 82 and the upstream slots 126, and a one-to-one (1:1) ratio between the rotor blades 82 and the downstream slots 160. Alternatively, there may be a two-to-one (2:1) ratio, a three-to-one (3:1) ratio, etc. between the rotor blades 82 and the upstream slots 126 and/or the downstream slots 160 in other embodiments.

The upstream slots 126 are configured as local strain amplifiers. The quantity Y of the upstream slots 126, the upstream slot width 148 and/or the locations of the upstream slots 126 relative to the rotor blades 82 may thereby be selected to selectively amplify a circumferential strain gradient in the upstream flange 114. The upstream slots 126, for example, may be sized and arranged such that circumferential strains at the upstream slot locations are less than seventy-five percent (75%) of a maximum strain along the upstream groove 124 if there were no upstream slots 126. Each upstream slot 126 of FIG. 4, for example, may be circumferentially associated with (e.g., aligned with, overlap, etc.) a respective one of the rotor blades 82 and its airfoil. Here, each upstream slot 126 of FIG. 4 is circumferentially offset from (e.g., does not circumferentially overlap) the leading edge 190 of the respective associated rotor blade 82. The present disclosure, however, is not limited to such an exemplary arrangement.

The downstream slots 160 are configured as local strain amplifiers. The quantity Z of the downstream slots 160, the downstream slot width 180 and/or the locations of the downstream slots 160 relative to the rotor blades 82 may thereby be selected to selectively amplify a circumferential strain gradient in the downstream flange 116. The downstream slots 160, for example, may be sized and arranged such that circumferential strains at the downstream slot locations are less than seventy-five percent (75%) of a maximum strain along the downstream groove 158 if there were no downstream slots 160. Each downstream slot 160 of FIG. 4, for example, may be circumferentially associated with (e.g., aligned with, overlap, etc.) a respective one of the rotor blades 82 and its airfoil. Here, each downstream slot 160 of FIG. 4 is circumferentially offset from (e.g., does not circumferentially overlap) the trailing edge 192 of the respective associated rotor blade 82. The present disclosure, however, is not limited to such an exemplary arrangement.

Figure 6:
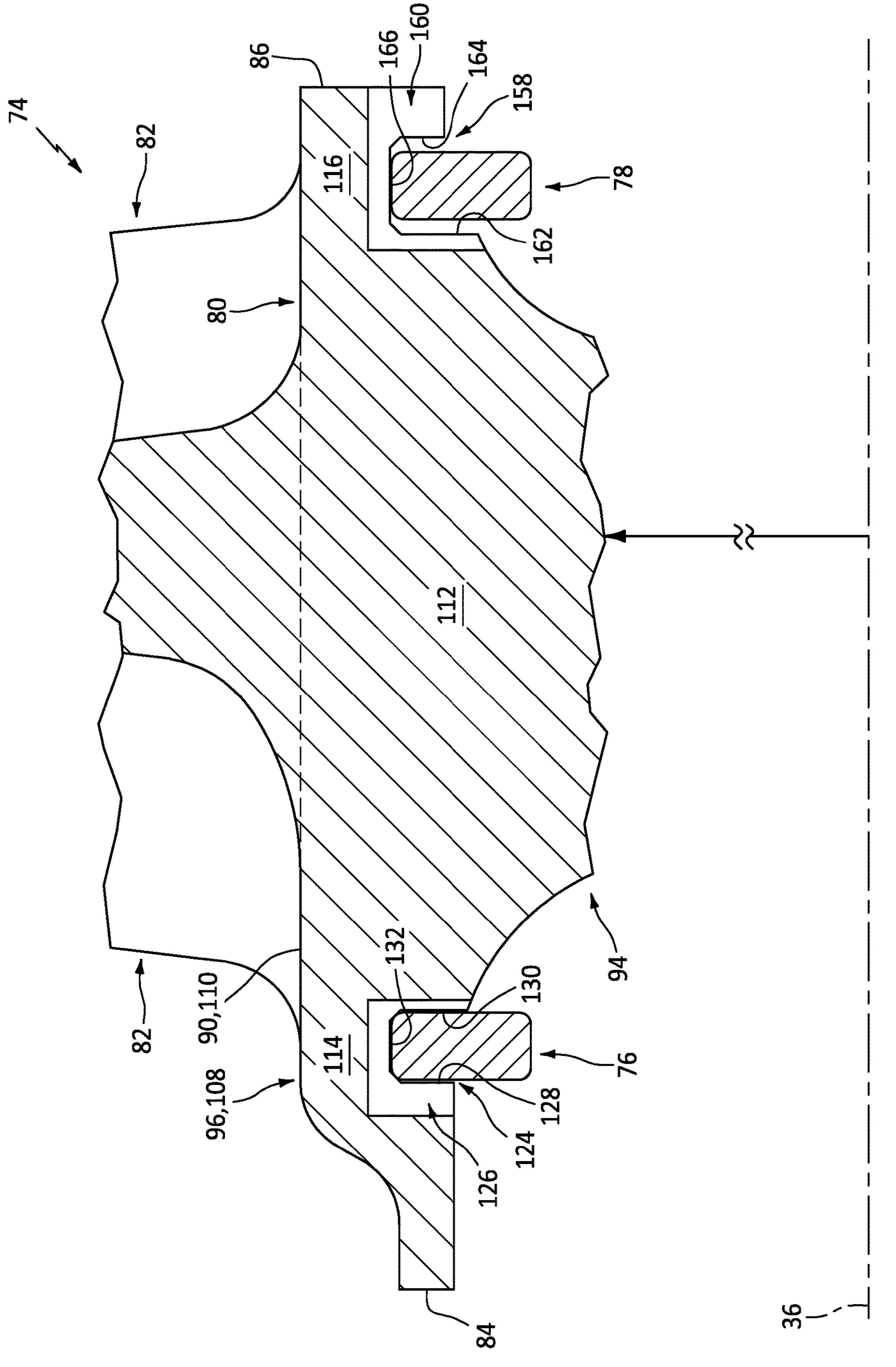
FIG. 6 is a partial sectional illustration of the rotor assembly.

Referring to FIG. 6, the upstream damper 76 extends circumferentially about (e.g., completely around) the axis 36. The upstream damper 76 is arranged axially between the disk web 94 and the rotor upstream side 84. This upstream damper 76 is mounted to the rotor disk 80 and seated within the upstream groove 124. The upstream damper 76 of FIG. 6, for example, is spring loaded into the upstream groove 124 to maintain contact between the upstream damper 76 and the upstream flange 114 while facilitating relative circumferential shifting between the upstream damper 76 and the upstream flange 114. With this arrangement, the upstream damper 76 projects radially (in the outward direction away from the axis 36) into the upstream groove 124 and may radially engage (e.g., contact, abut against, be biased against, etc.) the groove end surface 132. The upstream damper 76 may also axially engage one of the groove side surfaces 128 and 130. Typically, an axial width of the upstream damper 76 is sized (e.g., slightly) smaller than an axial width of the upstream groove 124 between the groove side surfaces 128 and 130. With this arrangement, the upstream damper 76 is operable to move (e.g., slightly shift) within the upstream groove 124 during rotation of the bladed rotor 74 to provide vibration damping.

The downstream damper 78 extends circumferentially about (e.g., completely around) the axis 36. The downstream damper 78 is arranged axially between the disk web 94 and the rotor downstream side 86. This downstream damper 78 is mounted to the rotor disk 80 and seated within the downstream groove 158. The downstream damper 78 of FIG. 6, for example, is spring loaded into the downstream groove 158 to maintain contact between the downstream damper 78 and the downstream flange 116 while facilitating relative circumferential shifting between the downstream damper 78 and the downstream flange 116. With this arrangement, the downstream damper 78 projects radially (in the outward direction away from the axis 36) into the downstream groove 158 and may radially engage (e.g., contact, abut against, be biased against, etc.) the groove end surface 166. The downstream damper 78 may also axially engage one of the groove side surfaces 162 and 164. Typically, an axial width of the downstream damper 78 is sized (e.g., slightly) smaller than an axial width of the downstream groove 158 between the groove side surfaces 162 and 164. With this arrangement, the downstream damper 78 is operable to move (e.g., slightly shift) within the downstream groove 158 during rotation of the bladed rotor 74 to provide vibration damping.

During high speed rotation, the bladed rotor 74 may be subject to various bending modes. These bending modes include, but are not limited to:

Mode 1: Easy wise bending such as bending from pressure to suction side and vice versa;

Mode 2: Stiff wise bending such as bending from leading edge to trailing edge and vice versa; and Mode 3: Torsional bending such as airfoil twisting about its stack line.

These bending modes are associated with vibrations within the bladed rotor 74 which may be damped using the dampers 76 and 78. Each damper 76, 78, for example, may provide mechanical damping through frictional contact between the respective damper 76, 78 and the rotor disk 80, as the rotor blades 82 go into and out of resonance. Here, the slots 126, 160 associated with the damper 76, 78 locally decrease stiffness of the rotor disk 80 along the respective damper 76, 78. By locally decreasing the stiffness along the damper 76, 78, relative motion between the respective damper 76, 78 and the rotor disk 80 may increase. By contrast, without providing the respective slots 126, 160, each damper 76, 78 may be pinned within the respective groove 124, 158 during high speed rotation of the rotor disk 80, thus, reducing or even nullifying damping capability of the respective damper 76, 78.

In some embodiments, referring to FIGS. 2 and 6, the bladed rotor 74 includes both the upstream damper 76 and the downstream damper 78. In other embodiments, however, the bladed rotor 74 may be configured without (a) the upstream damper 76 and, thus, the upstream groove 124 and the upstream slots 126, or (b) the downstream damper 78 and, thus, the downstream groove 158 and the downstream slots 160.

In some embodiments, referring to FIGS. 4 and 5, each upstream slot 126 may have a different configuration than each downstream slot 160. The upstream slots 126 of FIGS. 4 and 5, for example, extend axially within and are axially bounded within the upstream flange 114 whereas the downstream slots 160 project axially into the upstream flange 114. In other embodiments, however, these configurations may be reversed, or both the upstream slots 126 and the downstream slots 160 may have common (the same) configurations.

Figure 7B:
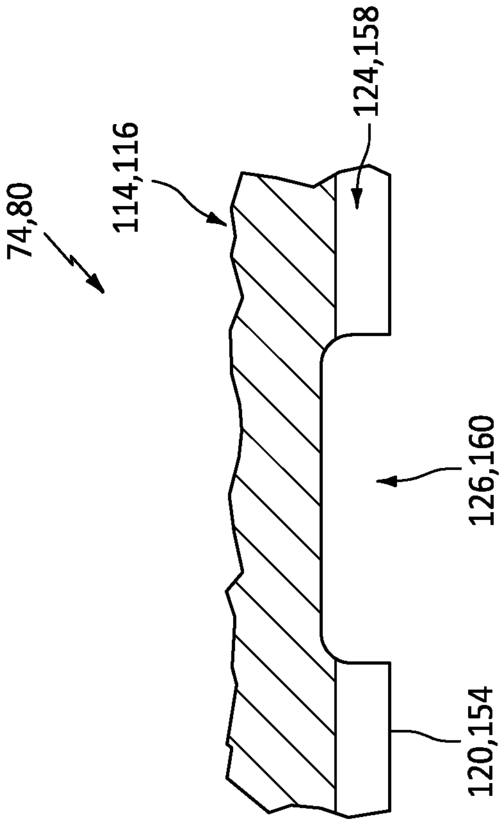
FIGS. 7A and 7B are partial sectional illustrations of the bladed rotor at a slot with various arrangements.
Figure 7A:
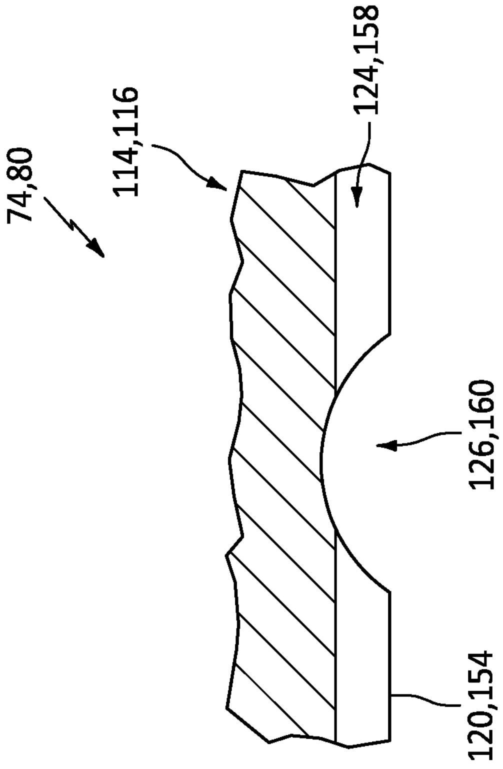

Referring to FIGS. 7A and 7B, each slot 126, 160 has peripheral geometry when viewed in a reference plane, for example, perpendicular to the axis 36 (see FIGS. 4 and 5). This peripheral geometry may be curved (e.g., see FIG. 7A) or polygonal (e.g., see FIG. 7B). Examples of the curved peripheral geometry include a partial circular geometry, a partial oval geometry, a splined geometry, etc. Examples of the polygonal peripheral geometry include a partial rectangular geometry, a partial trapezoidal geometry, etc. The present disclosure, however, is not limited to the foregoing exemplary slot geometries.

Figure 8B:
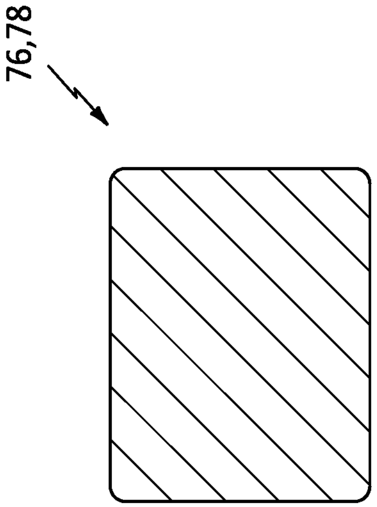
FIGS. 8A-C are partial sectional illustrations of a damper with various arrangements.
Figure 8C:
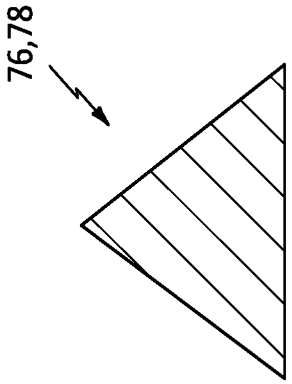
Figure 8A:
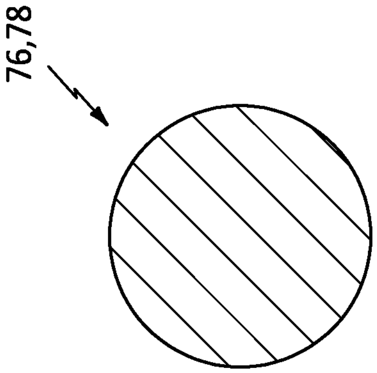

Referring to FIGS. 8A-C, each damper 76, 78 has a cross-sectional geometry when viewed in a reference plane, for example, parallel with (e.g., including) the axis 36 (see FIG. 6). This cross-sectional geometry may be rounded (e.g., see FIG. 8A) or polygonal (e.g., see FIGS. 8B and 8C). Examples of the rounded cross-sectional geometry include a circular geometry, an oval geometry, etc. Examples of the polygonal cross-sectional geometry include a square geometry, a rectangular geometry, a tapered (e.g., triangular, trapezoidal, etc.) geometry, etc.

In some embodiments, each damper 76, 78 may be configured as a single unitary body. In other embodiments, each damper 76, 78 may include multiple bodies.

In some embodiments, each damper 76, 78 may be constructed from metal; e.g., a nickel (Ni) based material. This metal may be the same material as or a different material than metal forming the bladed rotor 74. The damper(s) 76, 78 of the present disclosure, however, are not limited to any particular material construction.

While the damper(s) 76, 78 are described above with respect to the integrally bladed rotor 74, the present disclosure is not limited thereto. It is contemplated, for example, the damper(s) 76, 78 and the associated slotted grooves (e.g., elements 124 and 126, 158 and 160) may also provide damping for a bladed rotor (e.g., the HPT rotor 53 or the LPT rotor 54) with mechanical attachments removably securing its rotor blades to its rotor disk.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a gas turbine engine, comprising:

an integrally bladed rotor rotatable about an axis, the integrally bladed rotor including a plurality of rotor blades and a rotor disk;

the plurality of rotor blades arranged circumferentially around and projecting radially out from the rotor disk; and the rotor disk including a flange, a groove and a plurality of slots, the groove extending circumferentially around the axis within the flange, the groove projecting radially into the flange from an inner side of the flange, the plurality of slots arranged circumferentially about the axis along the groove, and each of the plurality of slots projecting radially into the flange from the inner side of the flange, wherein the groove projects radially into the flange from the inner side of the flange to an outer end of the groove, and each of the plurality of slots projects further radially into the flange from the outer end of the groove; and a damper mounted to the rotor disk and seated within the groove.

2. The assembly of claim 1, wherein the integrally bladed rotor is configured as a turbine rotor for the gas turbine engine.

3. The assembly of claim 1, wherein the groove extends axially within the flange between opposing axial groove side surfaces.

4. The assembly of claim 1, wherein the plurality of rotor blades consists of a first quantity of rotor blades;

the plurality of slots consists of a second quantity of slots; and the second quantity of slots is equal to the first quantity of rotor blades divided by an integer N.

5. The assembly of claim 4, wherein the integer N is equal to one.

6. The assembly of claim 1, wherein each of the plurality of slots is circumferentially aligned with a respective one of the plurality of rotor blades.

7. The assembly of claim 6, wherein each of the plurality of slots is circumferentially offset from a leading edge or a trailing edge of the respective one of the plurality of rotor blades.

8. The assembly of claim 1, wherein each of the plurality of slots axially intersects the groove.

9. The assembly of claim 1, wherein each of the plurality of slots extends axially across the groove.

10. The assembly of claim 1, wherein the plurality of slots comprises a first slot; and the first slot projects axially into the flange from an end of the flange.

11. The assembly of claim 1, wherein the plurality of slots comprises a first slot; and the first slot extends axially within the flange between opposing axial slot end surfaces.

12. The assembly of claim 1, wherein the plurality of slots comprises a first slot;

the first slot includes a first slot section and a second slot section circumferentially aligned with the first slot section;

the first slot section extends axially into the flange from a first side of the groove; and the second slot section extends axially into the flange from a second side of the groove.

13. The assembly of claim 1, wherein each laterally neighboring pair of the plurality of slots is laterally separated by a respective portion of the flange at the inner side of the flange.

14. The assembly of claim 1, wherein the rotor disk further includes a web; and the damper is arranged axially between the web and an upstream side of the integrally bladed rotor.

15. The assembly of claim 1, wherein the rotor disk further includes a web; and the damper is arranged axially between the web and a downstream side of the integrally bladed rotor.

16. The assembly of claim 15, further comprising:

a second damper mounted to the rotor disk; and the second damper arranged axially between the web and an upstream side of the integrally bladed rotor.

17. The assembly of claim 1, wherein the rotor disk further comprises a platform;

the plurality of rotor blades project radially out from the platform; and the platform comprises the flange.

* * * * *